United States Patent [19]
Eakman et al.

[11] Patent Number: 5,714,818
[45] Date of Patent: Feb. 3, 1998

[54] BACKUP BEARING FOR MAGNETIC BEARINGS

[75] Inventors: Kenneth J. Eakman, Byron; Terry L. Coons, Dayton; Michael Andres; Lance F. Miller, both of Rockford, all of Ill.

[73] Assignee: Barber-Colman Company, Loves Park, Ill.

[21] Appl. No.: 325,045

[22] Filed: Oct. 18, 1994

[51] Int. Cl.$^6$ ........................................... H02K 7/09
[52] U.S. Cl. ........................................... 310/90.5
[58] Field of Search ............... 310/90, 90.5; 384/215, 384/218, 219

[56] References Cited

U.S. PATENT DOCUMENTS

| | | | |
|---|---|---|---|
| 3,266,855 | 8/1966 | Cleff | 384/218 |
| 4,394,091 | 7/1983 | Klomp | 384/101 |
| 4,541,773 | 9/1985 | Drevet et al. | 415/111 |
| 4,629,261 | 12/1986 | Eiermann et al. | 310/90.5 |
| 4,641,978 | 2/1987 | Kapich | 384/102 |
| 4,808,869 | 2/1989 | Kopp | 310/103 |
| 5,021,697 | 6/1991 | Kralick | 310/90.5 |
| 5,040,907 | 8/1991 | Harvey | 384/574 |
| 5,126,612 | 6/1992 | Girault | 310/90.5 |
| 5,145,264 | 9/1992 | Bryden et al. | 384/275 |
| 5,231,323 | 7/1993 | New | 310/90.5 |

FOREIGN PATENT DOCUMENTS

| | | |
|---|---|---|
| 0 499 309 A1 | 8/1992 | European Pat. Off. . |
| 1305706 | 8/1962 | France ........... 384/215 |
| 1 332 694 | 10/1973 | United Kingdom . |
| 1 361 948 | 7/1974 | United Kingdom . |
| 2181496 | 4/1987 | United Kingdom ........... 384/219 |

OTHER PUBLICATIONS

Search Report on Application No. GB 9518660.7.

*Primary Examiner*—Clayton E. LaBalle
*Attorney, Agent, or Firm*—Leydig, Voit & Mayer, Ltd.

[57] ABSTRACT

A backup bearing for use with magnetic bearings to support a rotating shaft in the event that the magnetic bearings fail due to the loss of electric power. The backup bearing includes a housing and a fluid film bearing element which is adapted to passively float in the housing and with the shaft during normal operation of the magnetic bearings and which is adapted to support the rotating shaft on a film of fluid if the magnetic bearings fail.

19 Claims, 3 Drawing Sheets

BACKUP BEARING FOR MAGNETIC BEARINGS

BACKGROUND OF THE INVENTION

This invention relates generally to a bearing for supporting a rotating shaft and, more specifically, to a radial hydrodynamic air bearing for use as a backup bearing. While suitable for use with ball bearings and other fluid film bearings, the bearing of the present invention is particularly adapted for use as a backup bearing for electrically energized and electronically controlled radial magnetic bearings.

Backup bearings are used in a machine in conjunction with magnetic bearings to prevent a shaft from contacting non-rotating components. When the machine is inactive and the shaft is not rotating, the shaft rests on the backup bearings. Before the shaft begins to rotate, the magnetic bearings levitate the shaft upwardly off of the backup bearings to a predetermined axis of rotation. This axis of rotation is typically the geometric center of the magnetic bearings. The magnetic bearings maintain the rotating shaft on or near this predetermined axis of rotation during normal operation. In the event that the magnetic bearings fail due to either the loss of the electronic control signal or the loss of the electrical power supply, the backup bearings support the rotating shaft.

Since the rotating shaft does not contact the magnetic bearing components, magnetic bearings do not experience mechanical wear and can be designed for a relatively long operating life. For this reason, magnetic bearings are particularly suitable in applications where maintenance time is costly and where the bearings are located in hard to reach places. Magnetic bearings are also suitable for supporting a high speed rotating shaft and are suitable in applications where friction losses must be kept to a minimum.

Ball bearings are commonly selected as backup for magnetic bearings, however, ball bearings are not particularly compatible with the operating conditions that may have led to the selection of magnetic bearings in the first place. Ball bearings are generally not well suited for supporting a high speed rotating shaft due in part to friction caused by the rolling elements. To avoid this continuous frictional load and to avoid continuous wear of the rolling elements during normal operation, backup ball bearings are generally positioned with their centers coinciding with the predetermined axis of rotation so that they are passive components while the magnetic bearings are operating. In the event that the magnetic bearings fail, the shaft drops from its levitated position and engages the inner races of the backup ball bearings. The balls and races are then subject to skidding and damage from the resulting acceleration and impact forces. While damage to the backup ball bearings may be tolerable in some instances, since they protect the rest of the machine from damage, continued operation of the shaft at the original operating speed is generally impractical due to the continuing wear of the rolling elements and the resulting higher than normal rolling friction. Premature wear of the rolling elements also means that the backup ball bearings must frequently be replaced after they have performed their backup function. In other words, if a magnetic bearing failure was due to an electrical problem not related to the machine, the otherwise functioning machine may need to be taken out of service for replacement of the backup bearings.

Hydrodynamic air bearings, i.e., fluid film bearings that utilize air as the supporting medium, are an attractive alternative to ball bearings as backup for radial magnetic bearings. Like magnetic bearings, air bearings are suitable for supporting a high speed rotating shaft. Air bearings experience wear during starting and stopping of the rotating shaft, first before the shaft is hydrodynamically lifted from the interior surface of the bearing and then after the shaft drops to a speed insufficient to maintain the hydrodynamically developed layer or cushion of air. Air bearings, however, do not experience wear during normal operation since the shaft rides on the cushion of air. If the shaft is rotating at a speed that is within the operating range of the air bearing when the magnetic bearings fail, the hydrodynamic layer will develop when the rotating shaft drops from its levitated position and the air bearings will begin to support the rotating shaft on a film of air without experiencing any significant wear. In the event that electric power is restored to the magnetic bearings while the shaft remains rotating and supported by the film of air, the backup air bearings will again become passive components without having experienced any additional wear. Further, since air bearings are often designed to withstand many start/stop cycles, they are capable of repeatedly withstanding the stopping wear that may be associated with the failure of the magnetic bearings without frequent servicing of the machine to replace the backup air bearings. Moreover, since the operating friction of air bearings is relatively low, air bearings offer the opportunity for continued operation of the machine with the shaft rotating near its normal operating speed.

Despite the potential advantages that air bearings have over ball bearings, use of air bearings as backup for magnetic bearings has met with limited success for several reasons. The radial running clearance between a rotating shaft and an air bearing must be small (e.g., 0.0002–0.0005 inch) to provide for stable operation of the air bearing and to permit development of the pressure differential that is necessary to hydrodynamically generate the film of air between the rotating shaft and the interior of the air bearing. When the radial running clearance of an air bearing is compared to the radial operating clearance between the rotating shaft and the magnetic bearing components (e.g., generally 0.010 inch or greater), placement of an air bearing such that it is centered at the predetermined axis of rotation is extremely difficult. Assuming that the air bearings are successfully centered at the predetermined axis of rotation, the position error of the magnetic bearings must be kept within the radial running clearance of the air bearings. In addition, the air bearings and the magnetic bearings will tend to "fight" each other when the shaft is rotating. The hydrodynamic forces in an air bearing cause the shaft to rotate eccentrically with respect to the geometric center of the bearing. While the magnetic bearings are maintaining the shaft on or near the predetermined axis of rotation, the hydrodynamic forces in the air bearings attempt to move the shaft eccentric to the axis of rotation. This difference in operating characteristics results in significant power loss in the machine. In summary, the difficulties of integrating the dimensional and operational characteristics of air bearings and magnetic bearings have prevented the use of air bearings as backup for magnetic bearings.

SUMMARY OF THE INVENTION

The general aim of the present invention is to provide a new and improved backup bearing in which a fluid film bearing element is a passive component while radial magnetic bearings are actively supporting a rotating shaft and in which the fluid film bearing element supports the rotating shaft on a film of air if the magnetic bearings fail.

A detailed objective of the invention is to achieve the foregoing by providing clearance for the fluid film bearing element to radially float in a housing and with the rotating shaft while the shaft is suspended by the magnetic bearings.

Another detailed objective is to provide a means to restrict rotational movement of the fluid film bearing element to permit development of the supporting layer of air when the rotating shaft is not suspended by magnetic bearings.

These and other objects and advantages of the invention will become more apparent from the following detailed description when taken in conjunction with the accompanying drawings.

Figure 1:
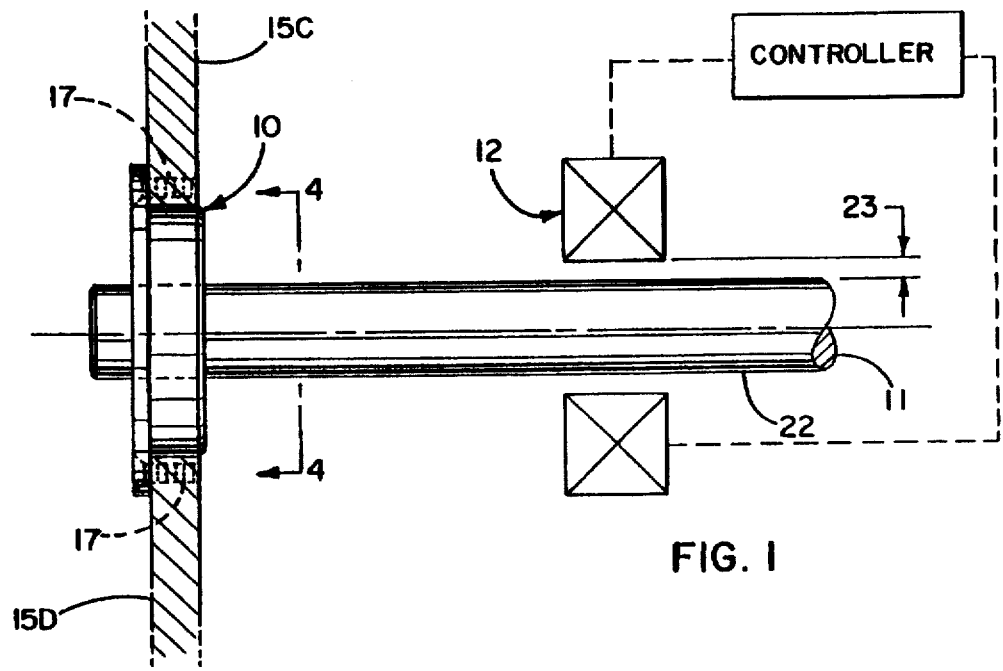
FIG. 1 is a side view of a typical rotary shaft which is normally supported by electronically controlled radial magnetic bearings and which is equipped with a new and improved backup bearing incorporating the unique features of the present invention.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the backup bearing 10 (FIG. 1) of the present invention is shown in conjunction with a rotary shaft 11 which is normally suspended by two or more electrically energized and electronically controlled primary radial magnetic bearings 12. The backup bearing 10 is also suitable for use with other primary radial bearings such as radial air bearings. For simplicity, only one backup bearing 10 and one primary radial magnetic bearing 12 have been shown. In the event that the primary magnetic bearings 12 fail due to an electrical failure in either the electrical power supply or in the electronic control signal to the magnetic bearings, the backup bearings support the rotating shaft.

Figure 2:
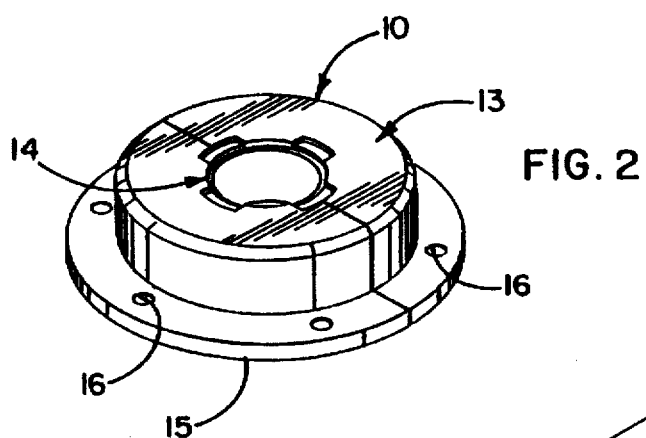
FIG. 2 is a perspective view of the backup bearing.
Figure 3:
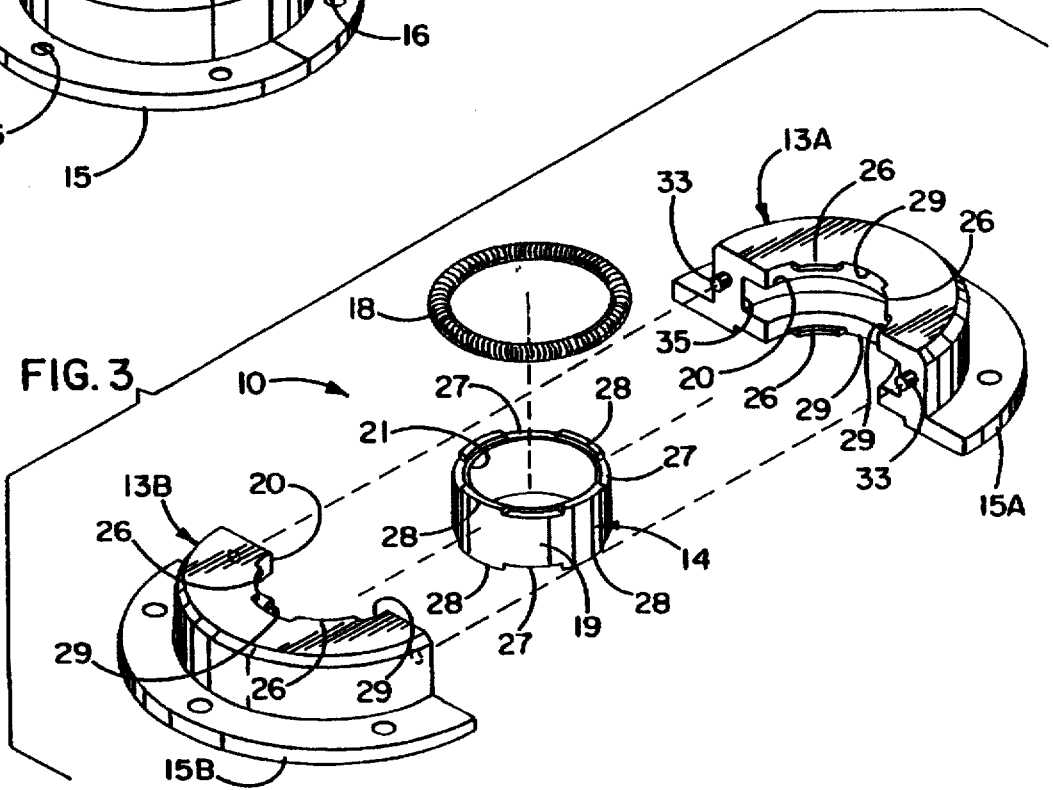
FIG. 3 is an exploded perspective view of the backup bearing.

The backup bearing 10 (FIG. 2) is a uniquely configured radial air bearing and includes a housing 13 and a hydrodynamic or fluid film bearing element 14 located in the housing. The housing is generally cylindrical with an integrally formed flange 15 projecting radially outwardly from one end of the housing. The flange has angularly spaced openings 16 to receive threaded fasteners 17 (FIG. 1) for mounting the backup bearing in a machine containing the rotating shaft. The backup bearing further includes a ring-shaped coil spring 18 (FIG. 3) located between the bearing element and the housing, and means (discussed below) for restricting rotational movement of the bearing element in the housing.

Figure 5:
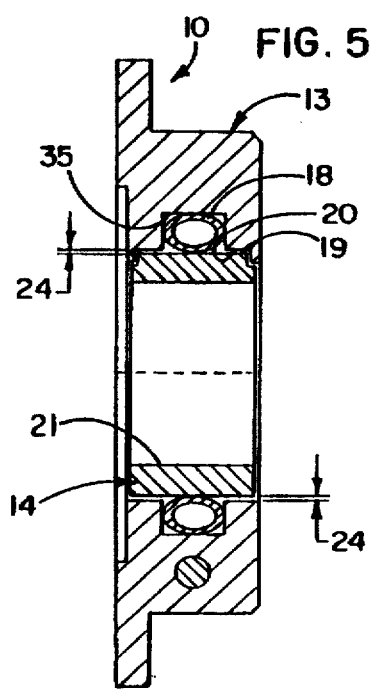
FIG. 5 is an enlarged cross-sectional view taken substantially along the line 5—5 of FIG. 4.

The bearing element 14 (FIG. 5) has a generally cylindrical outer surface 19 which is slidably received by the generally cylindrical inner surface 20 of the housing 13. The interior 21 of the bearing element is configured to support the rotating shaft 11 (FIG. 7) on a thin film of air which hydrodynamically develops between the interior of the bearing element and the outside diameter 22 of the rotating shaft. The interior of the bearing element is preferably a cylindrical journal, although other known journal configurations such as lobed symmetric or asymmetric journals which result in various hydrodynamic effects are also suitable for use in the backup bearing 10. The bearing element shown is constructed as a one-piece element, however, the bearing element could alternately be made by pressing an insert into the bearing element or by providing for a coating on a portion of the bearing element so that, for example, the interior of the bearing element will have certain material or wear characteristics.

There is a minimum radial operating clearance 23 (FIG. 1) that is associated with the magnetically suspended rotating shaft 11. Before the shaft begins to rotate, the magnetic bearings 12 levitate the shaft to a predetermined axis of rotation. This axis of rotation is typically the geometric center of the magnetic bearings. The magnetic bearings attempt to maintain the rotating shaft at this predetermined axis of rotation, however, the rotating shaft tends to migrate due to the influence of varying load conditions, external disturbances and control signal error. The minimum radial operating clearance 23 associated with the magnetically suspended shaft is the radial distance that the shaft and its rotating components can migrate from the predetermined axis of rotation before contact is made with the nearest non-rotating component. For purposes of illustration, the minimum radial operating clearance 23 is shown as the average radial clearance between the outside diameter 22 of the shaft and the inside diameter of the magnetic bearings.

Figure 6:
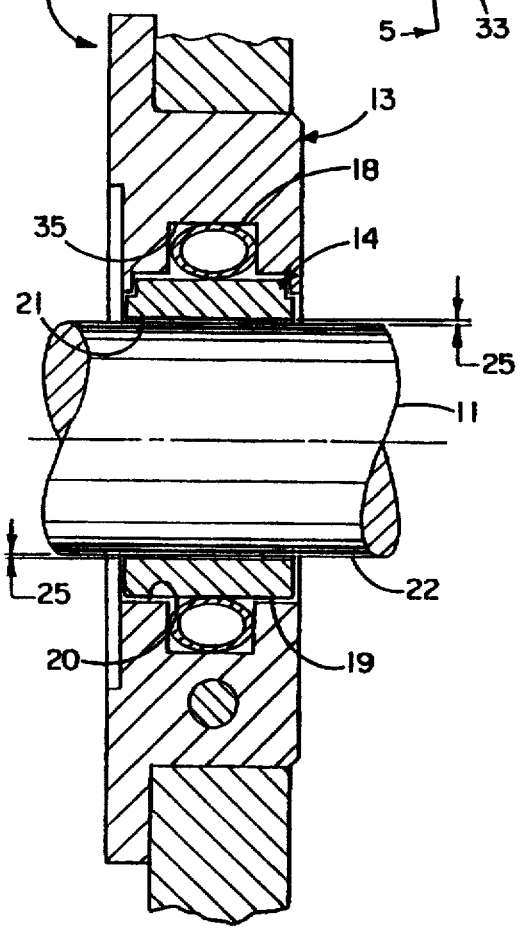
FIG. 6 is a view similar to FIG. 5 but shows the shaft when the shaft is rotatably supported by the magnetic bearings.

In accordance with the present invention, the backup bearing 10 is uniquely configured so that there is a clearance between the bearing element 14 and the housing 13 to allow the bearing element to float radially with respect to the housing. As a result, the bearing element floats with the shaft 11 when the shaft is rotating near its predetermined axis of rotation (FIG. 6) and the pressure differential that is necessary to support the rotating shaft 11 cannot develop between the interior 21 of the bearing element and the outside diameter 22 of the shaft. In this way, the backup bearings are passive components with respect to the shaft when the magnetic bearings 12 are operating. In addition, the bearing element is self-aligning and need not be precisely located at the predetermined axis of rotation since it is able to float within the housing and find the predetermined axis of rotation.

In carrying out the invention, there is a maximum radial gap 24 (FIG. 5) or radial free play wherein the bearing element 14 is free to move radially in the housing 13 prior to installation of the shaft 11. As shown, the maximum radial gap 24 is one-half the diametrical difference between the outer cylindrical surface 19 of the bearing element and the inner cylindrical surface 20 of the housing. There is also a maximum radial running clearance 25 (FIG. 6) between the outside diameter 22 of the shaft and the interior 21 of the bearing element. The backup bearing 10 is uniquely configured and dimensioned so that the sum of the maximum radial gap 24 and the maximum radial running clearance 25 is less than the minimum radial operating clearance 23 associated with the magnetic bearings 12. This dimensional restriction insures that the backup bearings 10 will prevent the rotating shaft from contacting non-rotating surfaces in the event that the magnetic bearings fail. In addition, this dimensional restriction insures that the shaft will rest on the backup bearings when the machine is inactive and the shaft is not rotating.

For example, assuming that the maximum radial gap 24 between the bearing element 14 and the housing 13 is 0.005 inch, that the maximum radial running clearance 25 between the bearing element and the shaft 11 is 0.0005 inch, and that the minimum radial operating clearance 23 between the shaft and the magnetic bearings 12 is greater than 0.010 inch, the sum of the maximum radial gap 24 and the maximum radial running clearance 25 is 0.0055 inch, which is less than the 0.010 inch radial operating clearance 23. Before the shaft is levitated, the shaft rests in the backup bearing 10 at 0.0055 inch away from the center of the magnetic bearings 12 and at least 0.0045 inch away from the closest non-rotating object. So long as the magnetic bearings maintain the position tolerance of the shaft within +/−0.005 inch of the predetermined axis of rotation, the hydrodynamic layer that develops between the bearing element and the shaft is due to the weight of the bearing element. This hydrodynamic layer permits the bearing element to float within the 0.005 inch radial gap 24 so that the bearing element is a passive component with respect to the shaft (e.g., see FIG. 6).

Figure 7:
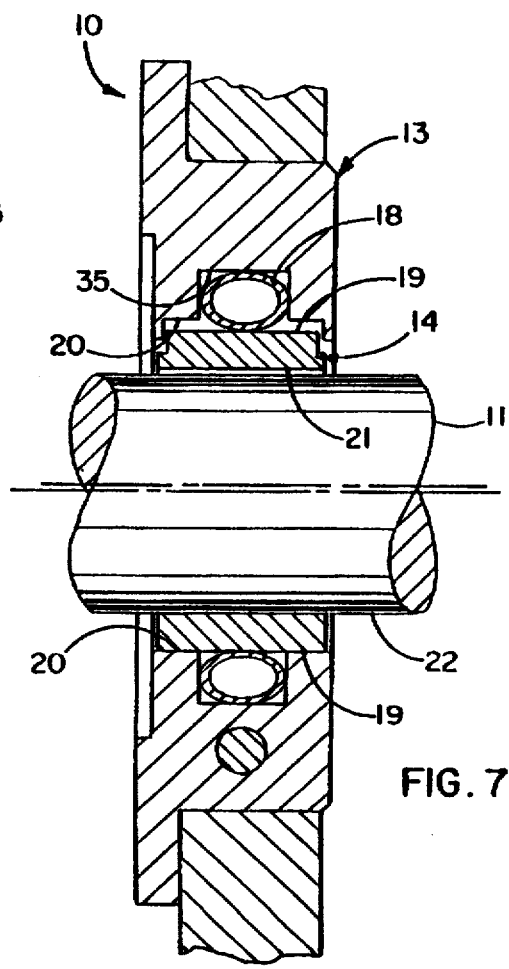
FIG. 7 also is a view similar to FIG. 5 but shows the shaft when the shaft is rotatably supported by the backup bearing.

Further in accordance with the present invention, the backup bearing 10 is configured to restrict the rotational movement of the bearing element 14 relative to the housing 13. In the event that the shaft 11 drops from its levitated position, the bearing element drops with the shaft (FIG. 7). Preventing the bearing element from rotating after it has dropped by an amount equal to the radial free play, so that the outer surface 19 of the bearing element engages the inner surface 20 of the housing, and after the shaft is within the dimensional running clearance of the fluid film bearing permits the shaft supporting hydrodynamic film to develop between the rotating shaft and the interior 21 of the bearing element.

Figure 4:
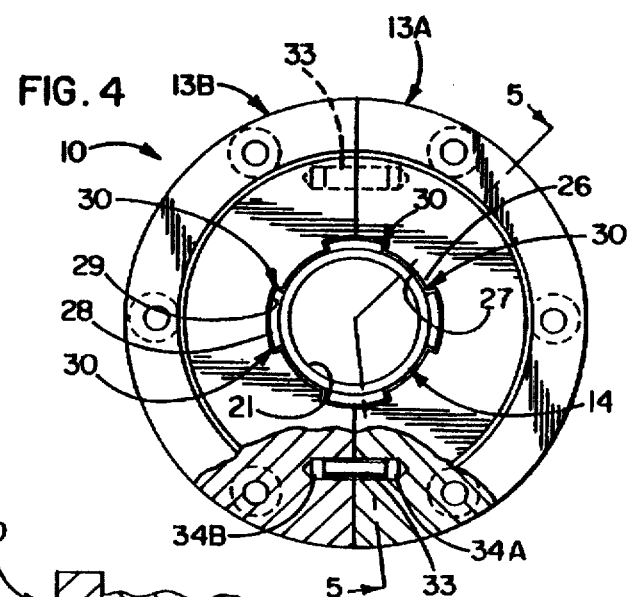
FIG. 4 is an enlarged end view of the backup bearing as seen along the line 4—4 of FIG. 1 with certain portions shown in cross-section.

More specifically, radially inwardly projecting portions or tabs 26 (FIGS. 3 and 4), integrally formed at each end of the housing 13 are slidably received in slots 27 located in the bearing element 14 for restricting rotational movement of the bearing element relative to the housing. In addition, rotation of the bearing element relative to the housing is restricted by tabs 28 which project axially from the ends of the bearing element and are slidably received in slots 29 in the housing. Preferably, the means selected for restricting rotation of the bearing element relative to the housing are dimensioned so as to not restrict the radial free play of the bearing element in the housing as defined by the maximum radial gap 24. To this end, the distance 30 (FIG. 4) between the edges of each tab 26, 28 and the adjacent edges of each corresponding slot 27, 29 is greater than the maximum radial gap 24. In the event that the clearance 30 is less than the maximum radial gap 24, then the maximum radial gap wherein the bearing element is free to radially move in the housing is defined by the maximum clearance 30.

Continuing with the example from above, if the bearing element 14 drops so that the outer surface 19 of the bearing element engages the inner surface 20 of the housing 13, and if the rotating shaft 11 drops so that it is within 0.0005 inch of the interior 21 of the bearing element (e.g., see FIG. 7), the shaft supporting hydrodynamic layer will develop between the shaft and the interior of the bearing element. Since the determination of actual radial operating and running clearances is dependent on many factors such as shaft diameter, shaft speed and operating loads, the dimensional example provided is intended for explanatory purposes only, and is not intended to provide design guidelines or to substitute for standard design practice.

Where the backup bearings 10 are used in conjunction with primary air bearings (not shown), the shaft 11 may be pneumatically lifted from the backup bearings before it begins to rotate or the backup bearings may support the shaft until it reaches a predetermine operating speed. However, the dimensional parameters previously defined, i.e., the minimum radial operating clearance, the maximum radial running clearance and the maximum radial gap, remain applicable.

The housing 13 (FIG. 3) is formed as a split assembly which is specially adapted for use in a machine having an axially split or clam-shell type housing. The housing 13 comprises two housing sections 13A, 13B and pins 33 for aligning the two housing sections. The flanges 15A, 15B integrally formed on the two housing sections are secured to the machine flanges 15C, 15D respectively. Openings 34A and 34B (FIG. 4) in the housing sections 13A and 13B, respectively, receive the pins 33. When the two machine flanges 15C, 15D are assembled together, the housing sections 13A, 13B meet in a plane which substantially coincides with a plane through the geometric center of the shaft 11. The two housing sections may be formed identically, or virtually identically except that the openings 34A may be formed to snugly receive each pin 33 while the openings 34B may be formed to slidably receive each pin. The backup bearing 10 is assembled by simply moving the two machine flanges 15C, 15D, i.e., the two housing sections 13A, 13B, radially toward the bearing element 14 and engaging the pins in the holes 34A and 34B. The edges of the tabs 26, 28 and the slots 27, 29 are formed so that the tabs are received by the slots as the housing sections are assembled together.

The ring-shaped coil spring 18 (FIG. 5) is contracted around the bearing element 14 and is located in a circumferential groove 35 formed in the inner surface 20 of the housing 13. The depth of the groove is less than the thickness of the coil spring so that the spring is preloaded against the outside surface 19 of the bearing element 14. The spring is designed so that, while the spring tends to center the bearing element in the housing, the bearing element remains capable of moving radially within the housing. When the backup bearings 10 are supporting the rotating shaft 11, the stiffness of the coil spring contributes to the stiffness characteristics of the hydrodynamic bearing.

Figure 8:
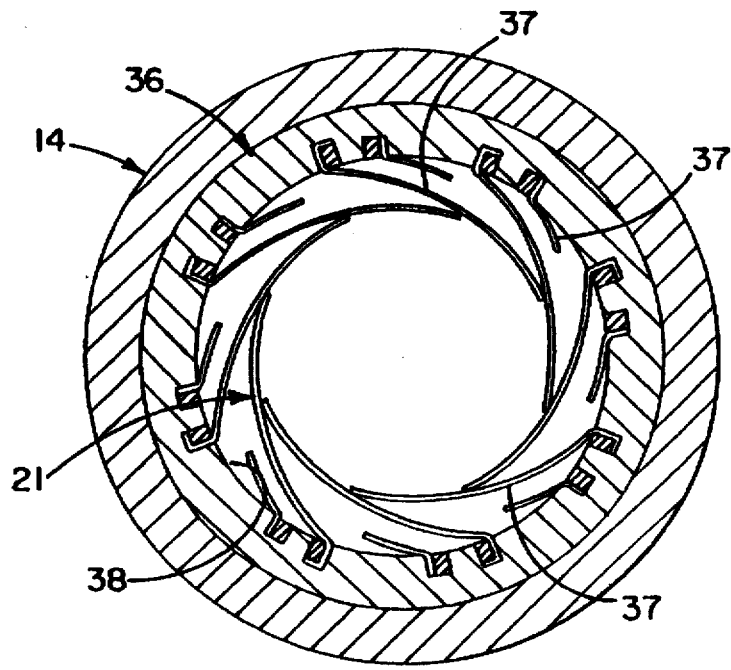
FIG. 8 is a cross-sectional view of another embodiment of the bearing element.

In an alternate embodiment, the interior 21 of the bearing element 14 is configured as a known foil bearing 36 (FIG. 8). The foil bearing may be in the form of an insert located in the bearing element as illustrated or it may be integrally formed in the bearing element. A typical foil bearing includes generally rectangular foils 37 made from thin resilient material. The foils are formed with a slight curvature and are circumferentially spaced around a generally cylindrical inner surface 38 with one end of each foil being secured to the inner surface 38. The secured foils extend circumferentially and overlie one or more adjacent foils. The exact configuration and thickness of foils used in the present invention affects the maximum radial running clearance 25 of the shaft 11 in the foil bearing. For purposes of the present invention, the effective foil thickness may be defined as the maximum total thickness of the foils passing through any radial line when those foils are compressed toward the inner surface 38. The maximum radial running clearance 25 is then determined by one-half the difference between the diameter of the inner surface 38 and the outside diameter 22 of the rotating shaft, minus the effective foil thickness.

Figure 9:
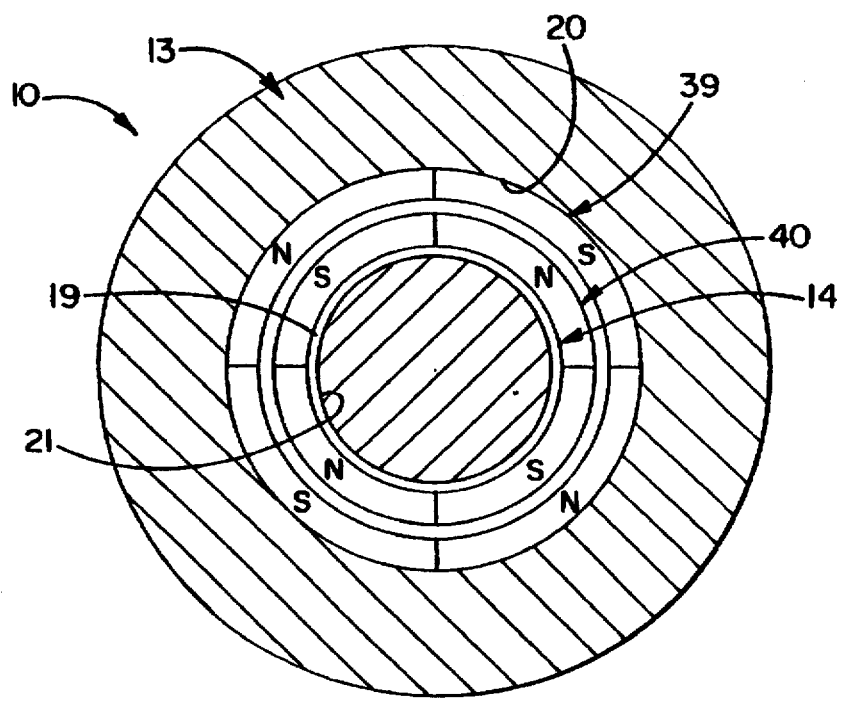
FIG. 9 is a schematic view of still another embodiment of the backup bearing.

In another alternate embodiment which is particularly suitable where the housing 13 is a one-piece housing, the bearing element 14 (FIG. 9) is rotationally retained relative to the housing 13 by providing cooperating permanent magnet rings 39, 40 secured to the housing and the bearing element, respectively. The permanent magnet ring 39 is formed with circumferentially extending magnetic segments having alternating magnetic poles and is secured to the inside surface 20 of the housing. The permanent magnet ring 40 is formed with an equal number of circumferentially extending magnetic segments having alternating magnetic poles. Each segment of the ring 40 is secured to the outer surface 19 of the bearing element 14 and subtends the same arc as a corresponding segment having an opposite magnetic polarity of the ring 30. When the bearing element is located in the housing, the magnetic rings 39, 40 are concentric so that the attractive and repulsive magnetic forces between the segments of the rings cooperate to generally center the bearing element in the housing near the predetermined axis of rotation and to restrict the free rotation of the bearing element from a magnetically stable rotational position. For the configuration illustrated, with each ring having four magnetic segments, there are two magnetically stable positions that the bearing element might take, the position shown and the position rotated 180 degrees from the position shown. If the bearing element begins to rotate from a stable position, the magnetic forces will cause the ring to return to the stable position. The magnetic rings could also be formed with axially alternating magnetic segments, in addition to the circumferentially alternating magnetic segments, to restrict axial movement of the bearing element relative to the housing. Alternately, the magnetic segments need not abut one another to form an entire ring.

From the foregoing, it will be apparent that the present invention brings to the art a new and improved backup bearing 10 in which a fluid film bearing element 14 is a passive component with respect to a rotating shaft 11 so long as magnetic bearings 12 are operating to support the rotating shaft and in which the fluid film bearing element hydrodynamically supports the rotating shaft on a cushion of air if the magnetic bearings fail. Accordingly, the backup bearing is capable of continuously supporting the rotating shaft and capable of repeatedly withstanding the stopping wear that may be associated with the failure of the magnetic bearings without frequent servicing of the machine to replace the backup air bearings.

We claim:

1. A backup bearing for use with a rotary shaft which is normally supported by primary radial bearings for rotation about a predetermined axis, there being a minimum radial operating clearance for said shaft rotating in said primary bearings, said backup bearing comprising a housing having an inner surface, a bearing element located in said housing, said bearing element having an outer surface and having means for supporting said shaft on a film of fluid when said shaft is rotating and is not supported by said primary bearings, there being a maximum radial running clearance between said shaft and said supporting means, and means for restricting rotation of said bearing element relative to said housing while allowing said bearing element to float radially relative to said housing through a maximum radial gap, the sum of said maximum radial gap and said maximum radial running clearance being less than said minimum radial operating clearance of said primary bearings, whereby said bearing element supports said shaft and prevents said shaft from touching non-rotating objects when said shaft is not supported by said primary bearings.

2. A backup bearing as recited in claim 1 wherein said housing further comprises two sections mating with one another in a plane substantially coinciding with a plane containing said predetermined axis, and means for releasably securing said housing sections in relative axial alignment whereby said housing may be removed from said bearing element by pulling said housing sections radially in opposite directions away from said bearing element.

3. A backup bearing as recited in claim 1 further comprising a ring-shaped coil spring, said housing further comprising a circumferentially extending groove formed in said inner surface, said spring being located in said groove and engaging said outer surface of said bearing element so that said bearing element is free to resiliently move radially within said radial gap.

4. A backup bearing as recited in claim 1 wherein said means for supporting said shaft comprises a generally cylindrical inner race.

5. A backup bearing as recited in claim 1 wherein said means for supporting said shaft comprises a generally cylindrical inner surface and a plurality of overlapping foils, each foil having at least two ends, said foils being circumferentially spaced around and secured to said inner surface and extending from said inner surface and generally circumferentially along said inner surface, each foil being formed so that at least one end of said foil overlies at least a portion of another circumferentially extending foil.

6. A backup bearing as recited in claim 1 wherein said means for restricting rotation of said bearing element comprises first and second magnetic segments of opposite magnetic polarity, said first segment being secured to said bearing element and said second segment being secured to said housing and in circumferential alignment with said first segment so that said segments are magnetically attractive.

7. A backup bearing as recited in claim 1 wherein said means for restricting rotation of said bearing element comprises first and second magnetic rings, each ring having a plurality of circumferentially spaced segments wherein adjacent segments are of alternating magnetic polarity, said first ring being secured to said bearing element and said second ring being secured to said housing, segments of one polarity of said first ring being circumferentially aligned with segments of opposite polarity of said second ring.

8. A backup bearing as recited in claim 1 wherein said means for restricting rotation comprises at least one member projecting from said bearing element, and wherein said housing further comprises at least one opening for slidably receiving said member.

9. A backup bearing as recited in claim 1 wherein said means for restricting rotation comprises at least one member projecting from said housing, and wherein said bearing element further comprises at least one opening for slidably receiving said member.

10. A backup bearing for use with a rotary shaft which is normally suspended by radial magnetic bearings for rotation about a predetermined axis, there being a minimum radial operating clearance for said shaft rotating in said magnetic bearings, said backup bearing comprising a housing having an inner surface, a bearing element located in said housing, said bearing element having an outer surface and having means for supporting said shaft on a film of fluid when said shaft is rotating and is not suspended by said magnetic bearings, there being a maximum radial running clearance between said shaft and said supporting means, and means for restricting rotation of said bearing element relative to said housing while allowing said bearing element to float radially relative to said housing through a maximum radial gap, the sum of said maximum radial gap and said maximum radial running clearance being less than said minimum radial operating clearance of said magnetic bearings, whereby said bearing element supports said shaft and prevents said shaft from touching non-rotating objects when said shaft is not suspended by said magnetic bearings.

11. A backup bearing as recited in claim 10 wherein said housing further comprises two sections mating with one another in a plane substantially coinciding with a plane containing said predetermined axis, and means for releasably securing said housing sections in relative axial alignment whereby said housing may be removed from said bearing element by pulling said housing sections radially in opposite directions away from said bearing element.

12. A backup bearing as recited in claim 10 further comprising a ring-shaped coil spring, said housing further comprising a circumferentially extending groove formed in said inner surface, said spring being located in said groove and engaging said outer surface of said bearing element so that said bearing element is free to resiliently move radially within said radial gap.

13. A backup bearing as recited in claim 10 wherein said means for supporting said shaft comprises a generally cylindrical inner race.

14. A backup bearing as recited in claim 10 wherein said means for supporting said shaft comprises a generally cylindrical inner surface and a plurality of overlapping foils, each foil having at least two ends, said foils being circumferentially spaced around and secured to said inner surface and extending from said inner surface and generally circumferentially along said inner surface, each foil being formed so that at least one end of said foil overlies at least a portion of another circumferentially extending foil.

15. A backup bearing as recited in claim 10 wherein said means for restricting rotation of said bearing element comprises first and second magnetic segments of opposite magnetic polarity, said first segment being secured to said bearing element and said second segment being secured to said housing and in circumferential alignment with said first segment so that said segments are magnetically attractive.

16. A backup bearing as recited in claim 10 wherein said means for restricting rotation of said bearing element comprises first and second magnetic rings, each ring having a plurality of circumferentially spaced segments wherein adjacent segments are of alternating magnetic polarity, said first ring being secured to said bearing element and said second ring being secured to said housing, segments of one polarity of said first ring being circumferentially aligned with segments of opposite polarity of said second ring.

17. A backup bearing as recited in claim 10 wherein said means for restricting rotation comprises at least one member projecting from said bearing element, and wherein said housing further comprises at least one opening for slidably receiving said member.

18. A backup bearing as recited in claim 10 wherein said means for restricting rotation comprises at least one member projecting from said housing, and wherein said bearing element further comprises at least one opening for slidably receiving said member.

19. A backup bearing for use with a rotary shaft which is normally supported by primary radial bearings for rotation about a predetermined axis, there being an operating clearance for said shaft rotating in said primary bearings which can vary within a predetermined range established by said primary bearings, said backup bearing comprising a housing having an inner surface, a bearing element in said housing, said bearing element having an outer surface supported in said housing and having an inner surface receiving said shaft and having a given clearance with respect to said shaft so that upon rotation of said shaft a hydrodynamic film of fluid separates the shaft from the bearing element, the operating clearance of said primary bearings being greater than said given clearance, support means supporting the bearing element within the housing to allow radial floating of the bearing element in normal range in which the primary bearings support the shaft while the shaft and the hydrodynamic film support the bearing element, the support means mechanically engaging the bearing element for support thereof upon deflection beyond said normal range so that the bearing element and hydrodynamic film support the shaft.

\* \* \* \* \*